Patented Nov. 11, 1952

2,617,799

UNITED STATES PATENT OFFICE 2,617,799

PURIFICATION OF STREPTOMYCIN DIHYDROSTREPTOMYCIN AND SALTS THEREOF

Robert E. Jones, Elkton, and Robert G. Bailey, Harrisonburg, Va., assignors to Merck & Co., Inc., Rahway, N. J., a corporation of New Jersey No Drawing. Application March 17, 1949, Serial No. 82,014

5 Claims. (Cl. 260—210)

This invention relates to streptomycin and, more particularly, to a process for the effective decolorization of streptomycin, derivatives and salts thereof.

Streptomycin is an extremely potent anti-bacterial substance possessing remarkable therapeutic properties and is produced in stationary and submerged cultures of streptomycin-producing strains of Actinomyces griseus as reported by Waksman et al. in Proced. Soc. Exptl. Biol. Med.—1944, 55, 66–9 and in U. S. Patent No. 2,449,866. Culture filtrates of this organism were found to exert strong bacteriostatic action, even in low concentrations, against many gram-positive bacteria, notably Bacillus mycoides and Bacillus subtilis, as well as gram-negative bacteria such as Salmonella marcescens and Escherichia coli.

Included within the scope of the present invention is a derivative of streptomycin, namely dihydrostreptomycin, produced by the hydrogenation of streptomycin in the presence of a catalyst. The antibacterial activity of this antibiotic is qualitatively and quantitatively similar to that of streptomycin in vitro with the added advantage of a reduced tendency to produce neurotoxic effects. It is especially desirable for those cases wherein relatively high dosages are required, such as have been suggested in the treatment of miliary and meningeal tuberculosis.

In the extraction process for streptomycin described in U. S. Patent No. 2,446,102, it has been observed that the crude streptomycin and solutions thereof frequently possess a considerable amount of objectionable pigmented deep red-brown material. This coloration is responsible for the subsequent formation of a colored calcium chloride complex that is extremely difficult to decolorize and often fails to satisfy the required color standards. The nature of the coloring matter has not been definitely determined, but it is believed that it is present in the initial streptomycin broth and that it accompanies the streptomycin in subsequent processing, its presence becoming increasingly evident when the solution is concentrated.

Heretofore, conventional methods for the removal of coloring matter from streptomycin and solutions of this antibiotic have not been entirely satisfactory. A method involving recrystallization of the streptomycin-calcium chloride complex salt does not adequately remove the coloration. Another common method for the decolorization of streptomycin solutions embodies the use of activated charcoal. The procedure consists merely in treating methanolic or aqueous solutions with a predetermined amount of carbon (in amounts as high as 25–30% based on total solids in the solution), agitating for 0.5 to 1.0 hours, followed by filtration. This procedure is not recommended due to the large and impractical quantities of adsorbent material required, and also because a product of optimum quality is not obtained even when treatment is conducted with excesses of charcoal. The process is likewise objectionable when one considers the uneconomical use of chemicals that is required, the equipment and time involved, the resulting contamination of the product with carbon fines and the appreciable losses of streptomycin due to adsorption on the charcoal, as the material adsorbed is only partially recoverable. The foregoing considerations apply as well to the treatment of streptomycin solutions with charcoal prior to formation of the complex.

Likewise, the presence of objectionable coloring matter in dihydrostreptomycin, dihydrostreptomycin salts and solutions thereof has been noted and usual methods for the removal of discolorations have not been very successful.

An object of this invention is to provide a simple and efficient method for the removal of undesirable coloration from compounds of the group consisting of streptomycin and dihydrostreptomycin, salts and solutions thereof.

Another object of this invention is to provide a method for the removal of coloring matter from compounds of the group consisting of streptomycin and dihydrostreptomycin, salts and solutions thereof without effecting any appreciable loss of therapeutically active material thereby.

A further object of this invention is to provide a method for decolorizing compounds of the group consisting of streptomycin and dihydrostreptomycin, salts and solution thereof without causing any loss in potency of the therapeutically active materials.

A still further object of this invention is to provide a method for decolorizing compounds of the group consisting of streptomycin and dihydrostreptomycin, salts and solutions thereof without contaminating the therapeutically active material.

These and other objects and features of the present invention will appear from the following detailed description thereof.

It has been discovered that, by treating aqueous, aqueous-alcoholic and alcoholic solutions of streptomycin and dihydrostreptomycin with oxidizing agents, the objectionable pigmentation is destroyed. For example, the calcium chloride complex prepared from treated streptomycin solutions possesses excellent color characteristics.

Surprisingly, by the use of this treatment, there has been little, if any loss of either streptomycin or dihydrostreptomycin, this result being entirely unexpected in view of the known vulnerability of these antibiotics when they are exposed to oxidants.

Accordingly, the process of this invention involves treating aqueous, aqueous-alcoholic, or alcoholic streptomycin and dihydrostreptomycin solutions at an acid pH of about 1.5–6.0 with oxidizing agents such as chlorine, bromine, potassium permanganate, sodium dichromate, hydrogen peroxide and the like until substantially all of the color disappears.

The strength of the solutions treated by this process and the composition of the solvent are not critical factors. The extent of decolorization is more easily observed when treating the more concentrated solutions. In the case of streptomycin, it is preferable to effect decolorization just prior to the step involving precipitation of the calcium chloride complex, so as to remove any coloration acquired during the previous processing. Decolorization efficiency is unaffected when the proportions of water and methanol are varied from 100% water to substantially 100% methanol.

To obtain efficient oxidation, the solution treated must be at an acid pH, thereby irreversibly destroying the coloring matter, care being taken to avoid possible destruction of the antibiotic. It is likewise preferable to conclude the oxidation at a pH below about 3.5 when treating methanolic solutions so that the pH of either the streptomycin or dihydrostreptomycin precipitated in the next operation is below about 4.0–4.5. Investigation has shown that either the streptomycin or dihydrostreptomycin precipitated from solutions of higher pH may discolor on drying.

Of the oxidants that can be effectively employed, chlorine is preferred because it does effect decolorization at a very rapid rate and because its reduced form, the chloride ion, is not a contaminant to either the streptomycin hydrochloride or dihydrostreptomycin hydrochloride solutions. This oxidant is likewise very convenient to use because it furnishes its own acidity, thereby obviating the necessity for pH adjustments prior to decolorization.

When chlorine is used, one mode of operation involves bubbling chlorine gas into a solution having a pH of about 5.0 to 6.0 until maximum decolorization is effected. The reaction is carried out at room temperature and, if properly executed, the temperature of the mixture will remain constant. The acidity is sharply increased during operations, dropping at times below pH 2. When this condition does arise, the pH is promptly adjusted to 3.5–4.0 with a caustic solution such as a sodium hydroxide solution. Care must be exercised in readjustment of the pH as both crude streptomycin and dihydrostreptomycin precipitated at a high pH, discolor considerably on drying. Where alcoholic solutions are being treated, the precipitate of sodium chloride is removed by filtration. The time required for decolorization is about 10–30 seconds when 20–50 cc. samples are used with a bubbling rate of about 3–5 bubbles/second through a 6 mm. tube.

In general, decolorization of a methanol solution by chlorine yields a precipitated crude streptomycin which, upon drying and re-dissolution in methanol for conversion to the calcium chloride complex, gives a light-colored solution and subsequently a calcium chloride complex of light color. Decolorization of methanol solutions using chlorine immediately prior to crystallization of the complex is feasible and does not jeopardize the crystallization yield.

The following examples illustrate the methods for carrying out the present invention, but it is to be understood that these examples are given by way of illustration, and not of limitation.

EXAMPLE I

*Decolorization of streptomycin solution with potassium permanganate*

196 cc. of a deeply-colored methanolic solution containing 126,900 $\gamma$/cc. of streptomycin recovered from fermentation broth by adsorption, elution and concentration was acidified to pH 1.5–2.0 with 2 cc. of concentrated hydrochloric acid. Decolorization of the solution was effected by the addition of 0.8 cc. of 5% aqueous potassium permanganate. The solution was neutralized with aqueous ammonia to pH 5–6, the final volume being 202 cc. The assay of the decolorized solution was 124,000 $\gamma$/cc., (25.08 x $10^6\gamma$), indicating no measurable inactivation of streptomycin.

EXAMPLE II

*Decolorization of dihydrostreptomycin sulfate in aqueous solution using permanganate*

A 10% solution of dihydrostreptomycin sulfate of objectionable color was prepared by dissolving 5 gms. of the solid in 50 cc. of water. To 10 cc. of the resulting yellow solution was added four drops of concentrated HCl, thereby lowering the pH of the solution to about a pH of 2. One drop of 5 per cent aqueous potassium permanganate was added to this acidified yellow solution. It was necessary to allow the solution to stand 8–10 minutes to discharge a small amount of excess pink color. The resulting solution was water clear. The bioassay showed an insignificant change from 80,300 $\gamma$/cc. to 80,000 $\gamma$/cc.; the optical rotation (1 dcm. tube) was unchanged at $-9°$.

EXAMPLE III

The irreversibility of the oxidation is indicated as follows:

(a) 20 cc. of a colored solution containing 120,000 $\gamma$/cc. of streptomycin dissolved in methanol was acidified to pH 1.5–2.0 with 4 drops of concentrated hydrochloric acid. Decolorization of the solution was effected by the addition of 8–10 drops of 5% aqueous potassium permanganate. About 1–2 g. of granulated zinc was added to the acidic solution, and rapid evolution of hydrogen was allowed to proceed for 5–10 minutes. No reappearance of color was noted.

(b) A 20 cc. solution of streptomycin was decolorized as in (a). About 0.5–1 g. of hydroxylamine hydrochloride was then added to the acidic solution and shaken for about 5 minutes. No reappearance of color was noted. The solution was made basic and agitated for another 5 minutes. Again, no color re-developed.

EXAMPLE IV

*Decolorization of streptomycin solution with sodium dichromate*

20 cc. of a deeply-colored methanolic solution containing crude streptomycin was acidified to pH 1.5-2.0 with several drops of concentrated hydrochloric acid. The addition of about 1-2 cc. of 5% aqueous sodium dichromate was sufficient to discharge the red color of the solution. The solution was then a pale orange color. The color was not further reduced by excess reagent.

EXAMPLE V

*Decolorization of streptomycin solution with hydrogen peroxide*

20 cc. of a deeply-colored methanolic solution containing crude streptomycin was acidified to pH 1.5-2.0 with several drops of concentrated hydrochloric acid. About 1-2 cc. of 30% hydrogen peroxide was added. Upon standing for several minutes, the solution gradually lightened in color until a pale yellow color finally resulted. Heating the solution did not increase the decolorization rate markedly.

EXAMPLE VI

*Decolorization of neutral streptomycin eluate with chlorine*

20 cc. of a neutral streptomycin eluate obtained from the elution of a carboxylic acid type resin was placed in a 125 cc. Erlenmeyer flask. The solution contained 13,110 $\gamma$/cc. of streptomycin. The flask was swirled while gaseous chlorine was bubbled through a 6 mm. tube at a rate of 510 bubbles per second for about 0.5 minute until maximum decolorization was achieved. The color of the solution changed from brown to very light yellow. The decolorized solution was assayed and found to contain 13,110 $\gamma$/cc. of streptomycin, indicating no measurable inactivation of streptomycin.

EXAMPLE VII

*Decolorization of aqueous streptomycin concentrate with chlorine*

20 cc. of aqueous streptomycin concentrate taken from a concentration of neutral streptomycin eluate was placed in a 125 cc. Erlenmeyer flask. The concentrate contained 27,000 $\gamma$/cc. of streptomycin. The flask was swirled while gaseous chlorine was bubbled through a 6 mm. tube at a rate of about 5 bubbles per second for about 0.5 minute until maximum decolorization was achieved. The color of the solution changed from red-brown to light yellow. The decolorized concentrate was assayed and found to contain 26,400 $\gamma$/cc. of streptomycin. Streptomycin hydrochloride of acceptable color can be recovered from such a decolorized concentrate by successively diluting with methanol, diluting with acetone to effect precipitation, filtering, and drying.

EXAMPLE VIII

*Decolorization of methanolic streptomycin solution with chlorine*

20 cc. of a methanolic solution of intensely-colored streptomycin was placed in a 125 cc. Erlenmeyer flask. The flask was swirled while gaseous chlorine was bubbled through a 6 mm. tube at a rate of about 5 bubbles per second for about 0.25-0.5 minute until maximum decolorization was achieved. The color of the solution changed from deep red to a light yellow. The decolorized concentrate was assayed and found to have sustained no measurable loss in activity. Streptomycin hydrochloride of acceptable color is recoverable from a solution treated in this manner by diluting the solution to effect precipitation, followed by filtration and drying.

EXAMPLE IX

*Decolorization of streptomycin calcium chloride complex in aqueous solutions using chlorine*

20 cc. of a 33% aqueous solution of streptomycin calcium chloride complex prepared from a tan-colored lot of complex was placed in a 125 cc. Erlenmeyer flask. The solution contained 187,200 $\gamma$/cc. of streptomycin. The flask was swirled while gaseous chlorine was bubbled through a 6 mm. tube at a rate of 5 bubbles per second for about 0.2-0.5 minute until maximum decolorization was achieved. The color of the solution changed from tan to water clear. The decolorized solution was assayed and found to contain 190,000 $\gamma$/cc. of streptomycin, indicating no measurable loss of activity.

EXAMPLE X

*Decolorization of dihydrostreptomycin sulfate in aqueous solution using chlorine*

A 10% soultion of dihydrostreptomycin sulfate was prepared from a colored lot of the salt by dissolving 5 gms. of the solid in 50 cc. of water. Twenty cc. of the resulting yellow solution was transferred to a 125 cc. Erlenmeyer flask and chlorine gas bubbled in gently (2-3 bubbles/second) through an 8 mm. tube until all of the yellow coloration was discharged. This operation took 30-40 seconds. The pH of the decolorized solution was 1.8-2.0. An aliquot of the solution was immediately diluted 1-100 in water and then 1-100 in phosphate buffer for assay. The assay showed a reduction in activity of 6 per cent from 80,300 $\gamma$/cc. to 75,200 $\gamma$/cc.; the optical rotation (1 dcm. tube) was observed to drop 3 per cent (from $-9.0°$ to $-8.8°$). The decolorized solution was water clear. When dihydrostreptomycin salt is separated from its decolorized solution, such as by freezing the solution and drying under vacuum from the frozen state, there is obtained a product that meets the color requirements for finished product.

EXAMPLE XI

*Decolorization of dihydrostreptomycin hydrochloride in methanolic solution using chlorine*

A 10% solution of dihydrostreptomycin hydrochloride was prepared by dissolution of five grams of the dry solid in 50 cc. of methanol. Twenty cubic centimeters of the resulting pale yellow solution was placed in a 125 cc. Erlenmeyer flask and chlorine gas bubbled in very gently (2-3 bubbles/second) through an 8 mm. tube until the resulting solution was water clear. This operation required 20-30 seconds. The pH of the decolorized solution was approximately 2. The solution was not neutralized as such, but immediately diluted 1-100 in water and then 1-100 in phosphate buffer for assay. The bio-assay showed a reduction in activity of 1% from 83,200 $\gamma$/cc. to 82,500 $\gamma$/cc.; the optical rotation (1 dcm. tube) showed no effect and remained at $-8.0°$.

Various changes and modifications may be made in carrying out the present invention without departing from the spirit and scope thereof. Insofar as these changes and modifications are within the scope of the appended claims, they are to be considered as part of this invention.

We claim:

1. A process for removing red-brown pigmented impurities from an antibiotic selected from the group consisting of streptomycin, dihydrostreptomycin, and salts thereof said red-brown impurities being obtained along with streptomycin recovered from fermentation broths by adsorption and elution, which comprises intimately contacting a solution of said antibiotic and impurities with an oxidizing agent selected from the group consisting of chlorine, potassium permanganate, hydrogen peroxide and sodium dichromate under acidic conditions, said oxidizing agent being contacted in an amount and for sufficient time to effect maximum decolorization without effecting any substantial decomposition of the antibiotic.

2. A process for removing red-brown pigmented impurities from an antibiotic selected from the group consisting of streptomycin, dihydrostreptomycin and salts thereof, said red-brown impurities being obtained along with streptomycin recovered from fermentation broths by adsorption and elution, which comprises intimately contacting a solution of said antibiotic and impurities with chlorine under acidic conditions, said chlorine being contacted in an amount and for sufficient time to effect maximum decolorization without effecting any substantial decomposition of the antibiotic.

3. A process for removing red-brown pigmented impurities from an antibiotic selected from the group consisting of streptomycin, dihydrostreptomycin, and salts thereof, said red-brown impurities being obtained along with streptomycin recovered from fermentation broths by adsorption and elution, which comprises intimately contacting a solution of said antibiotic and impurities with an oxidizing agent under acidic conditions, said oxidizing agent being contacted in an amount and for sufficient time to effect maximum decolorization but insufficient to effect any substantial decomposition of the antibiotic.

4. A process for removing red-brown pigmented impurities from streptomycin, said red-brown impurities being obtained along with streptomycin recovered from fermentation broths by adsorption and elution, which comprises intimately contacting a solution of said streptomycin and impurities with chlorine under acidic conditions at room temperature, said chlorine being added in an amount equivalent to that obtained by bubbling 3-5 bubbles of chlorine per second through a 6 mm. tube in a 20-50 cc. sample of said colored streptomycin solution for about 10-30 seconds.

5. A process for removing red-brown pigmented impurities from streptomycin, said red-brown impurities being obtained along with streptomycin recovered from fermentation broths by adsorption and elution, which comprises bubbling a stream of chlorine gas through a solution of said streptomycin and impurities, continuing the addition of chlorine until no further color change occurs without effecting any substantial decomposition of said streptomycin, and recovering streptomycin of improved color from the resulting solution.

ROBERT E. JONES.
ROBERT G. BAILEY.

REFERENCES CITED

The following references are of record in the file of this patent:

Van Dolah et al., Arch. Biochem., v. 12 (1947) p. 7-12.

Fried et al., JACS v. 69 (1947) p. 84.